United States Patent Office 2,894,042
Patented July 7, 1959

2,894,042
PREPARATION OF HEXAFLUOROBUTADIENE

William T. Miller, Ithaca, N.Y.

No Drawing. Application July 13, 1955
Serial No. 521,899

4 Claims. (Cl. 260—653.5)

This invention relates to a method for preparing aliphatic compounds completely substituted with chlorine and/or fluorine. In one aspect this invention relates to the production of halogenated olefins.

This application is a continuation-in-part of my prior and copending application Serial No. 200,657 filed December 13, 1950, now U.S. Patent 2,716,141.

Completely halogen-substituted organic compounds have recently come into considerable prominence where it is desired to take advantage of their resistance to chemical and thermal attack. This is particularly true of compounds containing a substantial amount of fluorine. For example, polymers of perfluoro and perfluorochloro olefins have been found to be particularly advantageous in such applications as gasket and packing materials, electrical insulation, chemical process equipment, as lubricants, heat transfer media, etc. Other uses of such compounds need not be detailed here as they are now known to those skilled in the art.

The compounds produced by the method of the present invention are useful as monomers in the preparation of polymeric materials or as intermediates in producing such monomers. The compounds produced by this method and the polymers produced therefrom are useful as lubricants, heat transfer media, plastics, solvents and as plasticizers for fluorine-containing polymers of high molecular weight. This is of especial value since such plasticizers or solvents are not affected by reactive chemical agents.

One of the objects of this invention is to provide a method for preparing aliphatic compounds completely substituted with chlorine and fluorine or with fluorine.

Still another object is to provide an economical method for producing in high yield relatively long chain fluoro- and fluorochloro carbon compounds.

A further object of the invention is to provide a method of preparing completely substituted fluorochloro or fluoro olefins useful as monomers in preparing high molecular weight plastic materials.

Other objects and advantages will become apparent from the accompanying description and disclosure.

In general, the foregoing objects are achieved by reacting elemental fluorine with at least one olefin of the formula $CR_1R_2=CR_3R_4$ where each of the substituents $R_1$, $R_2$, $R_3$ and $R_4$ is selected from the group consisting of chlorine, fluorine, a perfluoro group and a perfluorochloro group, preferably acyclic groups. The reactant olefins are limited to those in which at least one of the R substituents contains fluorine and at least three of the R substituents have fewer than three carbon atoms each. The double bond may also be a part of a cyclic structure comprised of not more than six carbon atoms. In that case two of the substituent R groups may be considered as joined by a common carbon-carbon bond to form the ring. As will appear more clearly hereinafter the product of the reaction consists of a fluorine-saturated condensation product of two molecules of reactant, unless more than one double bond is present in the reactant olefin. It has usually been found necessary to use a temperature of 10° C. or less in order to produce a satisfactory yield of the dimer, particularly for low molecular weight compounds having 2, 3 or 4 carbon atoms, and these are my preferred group, especially when the two R substituents on one of the carbon atoms of the ethylene are fluorine and/or chlorine. However, in the case of higher molecular weight compounds temperatures up to about 50° C. are useful. Also it is notable that some ethylene reactants which react sluggishly when treated alone will react more easily when condensed with a relatively reactive olefin to form a mixed condensation product. Examples of these and other reactions which appear hereinafter will serve to indicate and explain the scope of my invention. (The terms butane, butene and butadienes are used herein without prefixes to signify compounds whose basic chain contains four carbon atoms, and which may have substituents containing one or more carbon atoms so that the whole molecule may contain more than four carbon atoms. That is, the basic chain of the butane, butene or butadiene consists of the four carbon atoms of two molecules of ethylene reactant according to the formula above although the R substituents also contain carbon atoms.)

The mechanism of the reaction is such that the dimer reaction products are formed generally by end-to-end condensation with the simultaneous addition of fluorine in the 1,4-positions of the butane product thus:

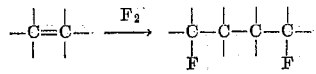

The products formed in this manner have the general formula $CFR_1R_2$—$CR_3R_4$—$CR_4R_3$—$CFR_2R_1$ where the R substituents are as defined in the preceding paragraph. The four carbon atoms of the ethylenic double bonds of two molecules which react in this way are treated herein as a butane even though they may be part of a ring structure or structures. The addition of fluorine on the end valences of the reactant olefin groups serves to prevent the formation of higher compounds. Other substituted butane compounds are also produced by side reactions in which fluorine participates. Such reactions may be the result of fluorine substitution, or the addition of the elements of chlorine fluoride which may be formed in the fluorine substitution or otherwise. The mechanism of these side reactions is uncertain.

When more than one double bond is present in the olefinic reactant, for example a butadiene, products having longer chains than a dimer may be formed in the reaction. This occurs because the fluorine in the usual case will add only on the carbon atoms of the olefinic groups which participated in the initial condensation reaction. Accordingly, unsaturated olefinic groups of the dimer are still available for further reaction with the original reactant or with unsaturated condensation products already formed.

The olefins are prepared in accordance with this invention and these olefins are used in the production of higher molecular weight compounds. When at least one of the R substituents on the ethylenic reactant is chlorine the resultant butane with chlorine on adjacent carbon atoms is dechlorinated relatively easily without affecting the fluorine in the molecule. For example, a preferred olefinic compound is symmetrical difluorodichloroethylene, $CFCl=CFCl$. When this compound is treated with fluorine at a temperature of less than 10° C., 1,2,3,4-tetrachloroperfluorobutane, $CF_2Cl$—$CFCl$—$CFCl$—$CF_2Cl$, is produced. The tetrachlorobutane is then, according to this invention, dechlorinated to yield a very valuable monomer hexafluorobutadiene-1,3, $CF_2=CF$—$CF=CF_2$. This diolefin is reacted with fluorine to produce compounds of eight, twelve, sixteen, etc., carbon atoms, according to the mechanism postulated in the preceding paragraph.

The dehalogenation reaction of this invention is carried out at a temperature between about 50° C. and about 250° C., preferably between about 100° C. and about 200° C. in the presence of a metal dehalogenating agent, such as zinc, in finely divided form. An alcohol is employed as a solvent or diluent during dehalogenation. The reaction may be carried out at atmospheric or superatmospheric pressure without departing from the scope of this invention.

The following examples are illustrative of the present method:

EXAMPLE 1

In a number of experiments, the following procedure was used: About 1120 grams of sym-difluorodichloroethylene (CClF=CClF) having a boiling point of about 20 to 23° C. was placed in a vessel having an inlet arm. A roll of copper gauze was then pushed into the inlet arm until it was just at the surface of the body of liquid monomer. The copper gauze, a stopper and an inlet tube were then inserted in the inlet arm making certain that the arm was sealed to the atmosphere.

A Dry Ice-acetone mixture was packed around the reaction vessel to cool it. The stirrer was then started in order to circulate the liquid reactant, and the vessel was flushed with nitrogen. Thereafter, fluorine was passed into the vessel at a rate approximately equal to the rate at which it was absorbed. The reaction was halted when a strong test for fluorine was obtained at the vessel outlet. In the series of experiments, the average yield was between 400 and 500 grams of 1,2,3,4-tetrachloroperfluorobutane, $CF_2Cl-CFCl-CFCl-CF_2Cl$. This compound may be distilled from the reaction mixture at a temperature between 60 and 70° C. at 75 mm. of pressure. The yield is about 30 to 40 percent based on the theoretical amount obtainable.

In a typical reaction other perchlorofluorobutanes are also obtained and it has been found that the yield of such compounds varies with temperature. In one run at the temperature of the Dry Ice-acetone bath the yield of $C_4Cl_4F_6$ was 30.0 percent while a 3.8 percent yield of $C_4Cl_5F_5$ and a 2.1 percent yield of $C_4Cl_6F_4$ were obtained.

A valuable product is obtained by dechlorinating the tetrachloro compound to yield hexafluorobutadiene-1,3. In a typical procedure for the dechlorination, 556 grams of zinc dust were suspended in 1.5 liters of absolute alcohol to which one kilogram of 1,2,3,4-tetrachloroperfluorobutane was added over a period of time. By adjusting the rate at which distillate was removed, a fairly constant reflux temperature of about 7 to 9° C. (uncorrected) was maintained and the hexafluorobutadiene was distilled continuously from the reaction flask. Employing the quantities of zinc, alcohol and butane indicated above, a yield of about 503 grams of hexafluorobutadiene-1,3 was obtained. This is a yield of about 95 percent of theoretical dechlorination.

The properties of 1,2,3,4-tetrachlorohexafluorobutane are as follows: boiling point 134.1° C. (corrected to 760 mm. Hg.); refraction index $n_D^{20}$ 1.3853; density $D_4^{20}$ 1.7812. The analysis as determined on a typical sample was 15.72 percent carbon and 37.45 percent fluorine (theoretical 15.8 and 37.5 percent, respectively). The molecular weight as determined on the same sample was 305 (theoretical 304).

The properties of $C_4Cl_5F_5$ are as follows: boiling point 90–92 (78 mm.); $n_D^{20}$ 1.4203; $D_4^{20}$ 1.7961. The fluorine analysis was 29.5 (theoretical 29.7 percent).

The properties of $C_4Cl_6F_4$ are as follows: boiling point 125–128° C. (76 mm.); $n_D^{20}$ 1.457. The fluorine analysis was 21.35 percent, the chlorine analysis 63.4 percent average (theoretical 22.63 and 63.2 percent, respectively).

EXAMPLE 2

The fluorination procedure described in Example 1 was also carried out with sym-difluorodichloroethylene at a temperature of approximately 0° C. by using crushed ice as coolant. From the fluorination a 6.5 mol percent yield of $C_4Cl_4F_6$ was obtained together with 7.2 mol percent of $C_4Cl_5F_6$ and 4.4 mol percent $C_4Cl_6F_4$. Relatively large amounts of the fluorine addition product of the ethylene and various fluorine-substitution products are also obtained at this temperature.

EXAMPLE 3

The same reaction between CCl=CClF was carried out using a Dry Ice-acetone bath as coolant which gives a temperature of about −75° C. The yield of 1,2,3,4-tetrachloroperfluorobutane was about 49 percent.

Examples 2 and 3 illustrate the effect of temperature on the reaction. The yield of the dimer is markedly decreased as the temperature of the reaction is increased about 10° C. while the yield of fluorine addition and substitution products is increased at the higher temperatures.

In order to dechlorinate the 1,2,3,4-tetrachloroperfluorobutane produced as above, 99.7 grams of the compound were added in small amounts to a suspension of 55 grams of C.P. zinc dust in 200 cc. of butyl carbitol. The reaction vessel was maintained at an elevated temperature by means of an oil bath heated to about 200° C. The reaction mixture was maintained at reflux temperatures and the reaction proceeded smoothly as the tetrachlorobutane was added. This procedure was repeated with a second sample of the tetrachlorobutane weighing 102 grams, and about 60 grams of zinc dust were used suspended in 150 cc. of butyl carbitol. The products of the two experiments were combined and distilled. The distillation yielded about 35 grams of hexafluorobutadiene-1,3. This is a yield of about 64 percent in the dechlorination.

EXAMPLE 4

A solution of 408 grams of sym-difluorodichloroethylene dissolved in 108.5 grams of $C_2Cl_3F_3$, (1,1,2-trichloroperfluoroethylene), was reacted with fluorine as already described using Dry Ice as coolant. The reaction product was fractionally distilled and 76.7 grams of the tetrachloroperfluorobutane

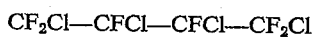

$$CF_2Cl-CFCl-CFCl-CF_2Cl$$

were collected at 64 to 66° C. at a pressure of 75 mm.

The tetrachloroperfluorobutane was dechlorinated with zinc dust suspended in dry dioxane to yield the compound $CF_2Cl-CF=CF-CF_2Cl$ as well as a small amount of hexafluorobutadiene. The monoolefinic butene compound has a boiling point of 65.5 to 65.7° C. at 744 mm. and its molecular weight was determined at 233 (theoretical 233). The chlorine content was determined as 33.2 percent (theoretical 32.8 percent).

EXAMPLE 5

Trifluorochloroethylene was reacted with fluorine with Dry Ice-acetone cooling to yield the compound $C_4F_8Cl_2$ with the isomer $CF_3-CFCl-CFCl-CF_3$, 2,3-dichloroperfluorobutane predominating. This isomer has a boiling point of 64° C. and a refractive index $n_D^{20}$ 1.3109. The molecular weight was determined as 270 (theoretical 271).

This 2,3-dichloroperfluorobutane was dechlorinated with zinc to yield perfluorobutene-2 which has the following properties: freezing point −134 to −136° C.; boiling point 1.2° C. (764.3 mm.); density $D_4^{-20}$ 1.001. The molecular weight was determined as 201 (theoretical 200).

Isomers of 2,3-dichloroperfluorobutane having the chlorine atoms in the 1,3 positions and in the 1,4 positions are also formed in the condensation reaction. The 1,4 dichloro isomer may also be prepared by fluorinating the compound $CF_2Cl-CF=CF-CF_2Cl$ (prepared as in Example 4) with elemental fluorine. The latter isomer has a boiling point of 64° C.

The 1,2-dichloro isomer, as prepared by chlorinating perfluorobutene-1, has a boiling point of 64° C. and a freezing point of 28–9° C. The observed carbon content was 18.2 percent (theoretical 17.7) and the observed molecular weight was 273 (theoretical 271).

EXAMPLE 6

At about 0° to 5° C., 181.3 grams of $CF_3$—$CCl$=$CCl_2$ was reacted with about 0.7 mole of fluorine diluted with nitrogen to obtain a 16.9 mole percent yield of $C_6Cl_6F_8$.

EXAMPLE 7

The compound $CF_3$—$CCl$=$CCl_2$ (240 grams) was diluted with $C_2Cl_3F_3$ (201.5 grams) and thereafter treated with 1.0 mole of fluorine diluted with nitrogen at a temperature of about 0–5° C. A yield of 14.7 mol percent $C_6Cl_6F_8$ was obtained.

This compound $C_6Cl_6F_8$ as prepared by the methods of Examples 6 and 7 has the following properties: boiling point 115° C. (20 mm.); $n_D^{20}$ 1.4387; density $D_4^{20}$ 1.9415. The chlorine content was determined as 49.1 percent (theoretical 48.7); the fluorine content was determined as 33.2 percent (theoretical 34.8); the molecular weight was determined as 429 (theoretical 437). The probable structure of this compound is:

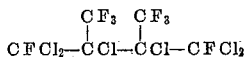

EXAMPLE 8

The compound 2-chloroperfluoropropene $$CF_3-CCl=CF_2$$

was reacted with fluorine at a temperature of about —75° C. The compound $C_6Cl_2F_{12}$, obtained with a yield of about 57 percent, had the structural formula

This compound was separated by distillation at 114 to 115.5° C. at 735 mm. Hg. The molecular weight of the compound was determined as 379 (theoretical 371) and the chlorine content was determined at 19.18 percent (theoretical 19.12). After recrystallization from ethyl alcohol the product was found to sublime at a temperature between 50 and 60° C. and the melting point was determined in a sealed tube as 91.5 to 93.0° C.

This compound was dechlorinated to form $C_6F_{12}$ with a yield of 85 percent. A zinc-copper couple, prepared by maintaining zinc dust in contact with a solution of copper sulfate, was used for the dechlorination with dioxane as solvent. The dechlorinated compound has a boiling point of 54.5° C. and a density $D_4^{20}$ of 1.6924, and its molecular weight after bromination was determined as 461 (theoretical 460). The dechlorinated compound, $C_6F_{12}$, has the structural formula:

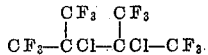

and may be fluorinated to yield the addition product $C_6F_{14}$ which has a boiling point of 57.5–59.0° C. and a density $D_4^{20}$ 1.7729.

EXAMPLE 9

A similar reaction to that described in Example 8 was carried out with Dry Ice coolant (about —52° C.). From 152.3 grams of $CF_3$—$CCl$=$CF_2$, a total of 32.1 grams of $C_6F_{12}Cl_2$ were recovered with a boiling range of 114 to 115.5° C. at atmospheric pressure. The molecular weight of this sample was determined as 371 (theoretical 371) and its chlorine analysis as 19.35 percent (theoretical 19.12 percent).

A sample of this compound was dechlorinated with a zinc-copper couple using absolute ethanol and another sample was dechlorinated under approximately the same conditions using dioxane as solvent. In each case the compound $C_6F_{12}$ was obtained.

EXAMPLE 10

The compound $CF_3$—$CCl$=$CF_2$ (96.5 grams) dissolved in 53.6 grams of trichlorofluoromethane, $CCl_3F$, was reacted with fluorine. The reaction was carried out with cooling by a Dry Ice-acetone mixture. The same reaction was repeated under the same conditions using 100.4 grams of $CF_3$—$CCl$=$CF_2$ disolved in 47.8 grams of $CCl_3F$. From the two experiments, 125.0 grams of $C_6F_{12}Cl_2$ were obtained.

EXAMPLE 11

About 110 grams of 1,4-dichloroperfluorobutene-2, $CClF_2$—$CF$=$CF$—$CClF_2$, were reacted with fluorine in a vessel cooled with crushed ice, the temperature being about 0 to 5° C. A yield of about 12.4 percent of $C_8Cl_4F_{14}$ with a boiling point of 125 to 126° C. (70 mm.) was obtained. This compound has the structural formula:

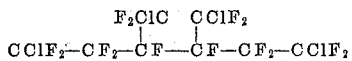

EXAMPLE 12

Using a Dry Ice-acetone coolant, a mixture of 107 grams of sym-dichlorodifluoroethylene and 187 grams of 2,3-dichlorohexafluorobutene-2, $CF_3$—$CCl$=$CCl$—$CF_3$, both dissolved in 107 grams of trichlorofluoromethane, was treated with 0.5 mole of fluorine diluted about 1:1 with nitrogen over a period of 7 hours. From the reaction mixture 53.9 grams of the mixed condensation product

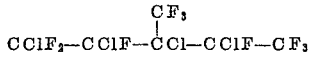

were separated. This compound has a boiling point of 175.8 to 176.0° C. at atmospheric pressure and of 108.0 to 108.2 at 100 mm. of pressure. The solidification point, determined in a sealed glass tube, was between —75 and —100° C. The density $D_4^{20}$ was 1.9016 and the refractive index $n_D^{20}$ was 1.3861. The average chlorine content was determined as 35.3 percent (theoretical 35.1 percent); the molecular weight as determined was 421 (theoretical 404). The fluidity of this compound over a wide range of temperature (—75° C. to 176° C.) is noteworthy. This example illustrates the condensation of two different ethylenic molecules.

EXAMPLE 13

Under conditions essentially the same as those in Example 12, sym-dichlorodifluoroethylene was condensed with 1,2-dichloroperfluoropropene-1, $CFCl$=$CCl$—$CF_3$. A tetrachloroperfluoropentane was separated and the compound had a boiling point of 153.3 to 153.9° C., a solidification point (in a sealed glass tube) of —111 to —126° C., a density $D_4^{20}$ of 1.8335 and a refractive index $n_D^{20}$ of 1.3665. The chlorine content was determined as 39.0 percent (theoretical 40.1 percent) and the molecular weight was determined as 348 (theoretical 354). This product may have the structure of either of the two isomers: $CClF_2$—$CClF$—$CClF$—$CF_3$ or

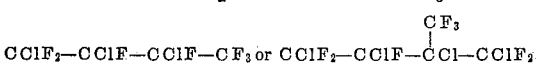

or may be a mixture of both. However, it is most likely that the dominant isomer is the latter one, and this is a very valuable compound since it may be dechlorinated to yield methyl-substituted conjugated perfluorobutadiene, a valuable monomer for preparing high molecular weight plastic polymers.

EXAMPLE 14

Under essentially the same conditions as those of Example 12, a mixture of sym-dichlorodifluoroethylene and perfluorocyclobutene,

were condensed together by the fluorine treatment to yield the compound,

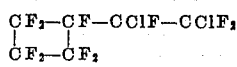

This product has a boiling point of 104.6 to 105° C. and solidifies in a sealed glass tube between −84 and −100° C. The density $D_4^{20}$ is 1.7410 and the refractive index $n_D^{20}$ is 1.3294. The measured molecular weight was 336 (theoretical 333) and the chlorine content was found to be 21.2 percent (theoretical 21.3). This example illustrates the condensation of a cyclic and an acyclic compound, each containing an ethylenic double bond. In this case the substituted groups $R_1$ and $R_3$ in the formula $CR_1R_2=CR_3R_4$ are considered to be two difluoromethylene groups, $CF_2$, on the carbon atoms of the ethylene groups with the substituents $R_1$ and $R_3$ joined by a common carbon to carbon bond.

EXAMPLE 15

Under essentially the same conditions used in Example 12, perfluorocyclobutene alone was treated with fluorine with the reactant dissolved in an inert solvent as described. The condensation product was isolated from the reaction mixture and it has the formula:

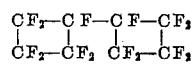

This compound boils at a temperature of 86.2 to 87.3° C. and melts at −6.75° C. Its density $D_4^{20}$ is 1.7511 and its refractive index $n_D^{20}$ is 1.295. The measured molecular weight was 366 (theoretical 362). This example illustrates the condensation of two molecules of a cycloolefin.

EXAMPLE 16

About 546 grams of hexafluorobutadiene-1,3 were treated with fluorine in a vessel cooled with a Dry Ice-acetone mixture. The fluorine treatment was continued until the reaction mixture became too viscous to be circulated. The temperature was then permitted to rise to about 0° C. with the reaction vessel cooled with crushed ice. The fluorine treatment was then continued at 0° C. with stirring until the absorption of fluorine became slow.

The reaction mixture was then distilled to obtain the following fractions: (1) 12.0 g., B.P. 80–90° (750 mm.); (2) 88.1 g., B.P. 95–102° (750 mm.); (3) 20.6 g., B.P. 30–80° (40 mm.); (4) 42.4 g., B.P. 80–89° (40 mm.); (5) 20.2 g., B.P. 89° (40 mm.) to 93° at (10 mm.); (6) 37.1 g., B.P. 93–103° (10 mm.); (7) 49.4 g., B.P. 105 to 127° (5 mm.); (8) 119.0 g. solid residue. All of the fractions were found to contain a considerable amount of unsaturation and several of the fractions were then treated separately with chlorine with light and heat and then redistilled to remove residual unsaturated material as higher boiling chlorine addition products. In this way the following fractions were obtained:

Table 1

| B.P. of Fraction | Observed Mol. Wt. | Calcd. Mol. Wt. |
| --- | --- | --- |
| 100–101° | 432, 438 | $C_8F_{18}$—438 |
| 91–93 at 50 mm | 624, 606 | $C_{12}F_{26}$—638 |
| 90–95 at 10 mm | 834 | $C_{16}F_{34}$—838 |
| 153–177 at 7 mm | 1,420, 1,450 | $C_{28}F_{58}$—1,438 |

This example represents a typical reaction of a conjugated diolefin to yield varying amounts of higher molecular weight compounds. The results are probably due to the condensation of reactant butadiene with unsaturated product already formed and to condensation of unsaturated products. It is evident that the length of the chain does not interfere with the reaction of the double bond. This is further illustrated in Examples 17 and 18.

EXAMPLE 17

An unsaturated 8-carbon atom thermal dimer of $C_4F_6$ may also be obtained as described in my copending application Serial No. 601,387, filed June 25, 1945, now abandoned, by heating hexafluorobutadiene-1,3 in a sealed bomb (suitably between 100 and 200° C.). About 170.9 grams of an unsaturated dimer (boiling point 95–102° C.) produced in this way was treated with fluorine for about 4 hours and 50 minutes. The reaction mixture was separated by successive fractional distillations and the fractions obtained are listed in Table 2. The boiling points are those of the major portions of the fractions separated.

Table 2

| Boiling Point | Fraction | Yield, percent |
| --- | --- | --- |
| 102–104° C. (10 mm.) | $C_{16}$ | 22 |
| 180–186° C. (10 mm.) | $C_{24}$ | 19 |
| 220–225° C. (10 mm.) | $C_{32}$ | 36 |

EXAMPLE 18

The 12-carbon atom unsaturated product of the hexafluorobutadiene thermal reaction (described in my copending application Serial No. 601,387, filed June 25, 1945, now abandoned) was treated with fluorine at a temperature of less than 0° C. to yield compounds containing 24 and 36 carbon atoms. For example, from 303 grams of the trimer, 132 grams, roughly a 40 percent yield, of the $C_{24}$ and $C_{36}$ compounds were obtained boiling in the range 140 to 235° C. at 10 mm. A residue of 49.4 grams, about 15 percent, was obtained and consisted essentially of still higher molecular weight condensation products.

The fractions obtained in Examples 12, 13 and 14 vary in viscosity according to their molecular weight and the higher molecular weight fractions are particularly valuable as lubricants. Any unsaturation in these compounds may be destroyed by treating them with cobalt trifluoride or chlorine trifluoride ($ClF_3$) at an elevated temperature.

It is apparent from the foregoing description that a wide variety of compounds may be prepared in accordance with this invention. Using the procedures described in detail in the examples other fluorine-containing butanes, butenes, and butadienes may also be prepared. For example, the reaction of tetrafluoroethylene with fluorine yields n-decafluorobutane, $C_4F_{10}$. The reactions of asymmetrical dichlorodifluoroethylene and of trichlorofluoroethylene yield particularly valuable butanes which may be dechlorinated to give butene or butadiene compounds useful in the preparation of higher molecular weight polymers. For example, treatment of the trichlorofluoroethylene proceeds according to the following reaction:

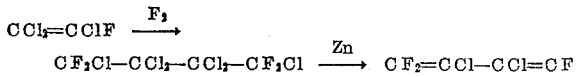

The butane $CF_2Cl$—$CCl_2$—$CCl_2$—$CF_2Cl$ has a boiling point of 125–126° C. (76 mm.). The dechlorinated product, $CF_2=CCl$—$CCl=CF_2$, has a boiling point of 67–70° C. The chlorine-containing conjugated butadienes may be reacted in a manner similar to hexafluorobutadiene-1,3 to yield higher molecular weight products. The following reaction is also of considerable interest since it yields a conjugated butadiene with methyl substituents by dechlorination:

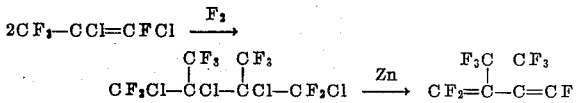

The methyl substituted butadienes may also be employed in preparing higher molecular weight compounds. The reaction of perfluorobutene-1 with fluorine yields perfluorooctane. The reactant olefin may also have perfluoro or perfluorochloro cyclic substituents, for example the perfluorophenyl radical or perfluorochlorocyclohexyl radical. Generally, treatment of a mixture of two or more olefins with fluorine in accordance with this invention yields all of the possible condensed products including those in which molecules of each of the reactants have combined. An important co-condensation is the following:

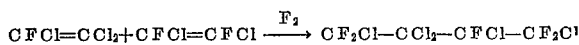
$$CFCl=CCl_2+CFCl=CFCl \xrightarrow{F_2} CF_2Cl-CCl_2-CFCl-CF_2Cl$$

This butane may also be dechlorinated to yield the conjugated butadiene $CF_2=CCl-CF=CF_2$.

As noted hereinbefore the temperature of the reaction has a considerable effect on the relative amounts of the different products produced. Thus, at the lower temperatures, the production of the condensation product is favored while at higher temperatures, of the order of 10° C. and more for example, fluorine addition and substitution products tend to increase with relatively lower yields of the dimer. However, some of the higher molecular weight olefins, such as octenes, react with fluorine to produce compounds which are too viscous below 10° C. to be circulated and these require higher temperatures, up to about 50° C. Perfluoroolefins are more satisfactory than chloroperfluoroolefins for reaction at temperatures above 10° by the process of this invention because by-products due to the transfer of chlorine cannot arise.

The use of a solvent for the reaction with fluorine is often effective for the purpose of keeping the products fluid at the low temperatures employed. Of course, it is required that any solvent used be inert to fluorine and for this reason the saturated, lower molecular weight non-hydrogenous fluorocarbons and chlorofluorocarbons, such as the freons, are preferred as a class. These compounds are not only resistant to fluorine but for the most part are also fluid at the low temperatures required for carrying out my method. The solvent is also effective in regulating the rate of reaction. Dilution of the fluorine with an inert gas such as nitrogen is also helpful in moderating the reaction.

It will be noted that the compounds produced by the present method are formed by "head-to-head" or "tail-to-tail" condensation. Isomers of these compounds may also be formed in the reaction by head-to-tail condensation, but in the usual case one isomer dominates as indicated in the examples described above.

The dechlorination of fluorine-containing butanes according to this method is preferably carried out with zinc in a dechlorination solvent. Solvents useful for this purpose include the lower aliphatic alcohols such as methanol, ethanol or propanol, the carbitols, the cellosolves, benzyl alcohol, dioxane and mixtures of dioxane and glycerin. The dechlorination reaction is suitably carried out at moderate temperatures and preferably under reflux conditions to distill the dechlorinated product from the reaction mixture as it is formed. The immediate removal of the product makes it possible to dechlorinate a butane only partially where it contains at least four chlorine atoms. Other suitable dechlorinating metals may also be used such as magnesium.

Fluoro compounds containing halogens other than chlorine are prepared by treating a dechlorinated butane with the desired halogen. For example, the butane product of Example 5, $CF_3-CFCl-CFCl-CF_3$, may be dechlorinated to yield perfluorobutene-2

$$CF_3-CF=CF-CF_3$$

which upon treatment with bromine yields the 2,3-dibromo derivative $CF_3-CFBr-CFBr-CF_3$ with a boiling point of 95.0° C. (751 mm.) and a refractive index $n_D^{20}$ 1.3574. This compound had an observed molecular weight of 361 (theoretical 359.9). Another example of this type of component is 2,3-dibromo-1,4- dichloroperfluorobutane, $CF_2Cl-CFBr-CFBr-CFCl$, prepared by partially dichlorinating $$CF_2Cl-CFCl-CFCl-CF_2Cl$$

to yield $CF_2Cl-CF=CF-CFCl$ and then brominating this olefin. The recultant bromine-containing butane, $CF_2Cl-CFBr-CFBr-CF_2Cl$, has a boiling point of 60–65° C. (12 mm.) and a refractive index $n_D^{20}$ 1.428.

The butanes, butenes, and butadienes prepared in accordance with the methods described herein are valuable for many purposes. Those butanes containing chlorine may be dichlorinated to yield butene or butadiene monomers for synthesising corrosion and heat resistant higher polymers. Polymerizations of the conjugated butadienes yield rubbery plastic materials. For example, the conjugated butadienes, notably hexafluorobutadiene-1,3, may be polymerized according to the methods disclosed in my copending application, Serial No. 10,912, filed February 25, 1948, now U.S. Patent No. 2,567,956, and in the copending application of Miller et al. Serial No. 773,292, filed September 10, 1947, now U.S. Patent No. 2,586,550. Lower molecular weight products formed from this compound, for example by the methods disclosed herein, and containing up to about 36 carbon atoms may be treated with fluorine or chlorine as described in my copending application Serial No. 601,387, filed June 25, 1945, now abandoned. Such treatment saturates the compound and provides liquids or grease-like materials which are suitable as heat exchange media, lubricants, solvents and the like having a high degree of chemical stability.

Since many embodiments might be made of the present invention and since many changes might be made in the embodiment described, it is to be understood that the foregoing decription is to be interpreted as illustrative only and not in a limiting sense.

I claim:

1. A method of preparing hexafluorobutadiene-1,3 which comprises reacting sym-dichlorodifluoroethylene with fluorine at a temperature of less than 10° C. to produce 1,2,3,4-tetrachloroperfluorobutane and dichlorinating at a temperature between about 50° C. and about 250° C. said butane to leave hexafluorobutadiene-1,3.

2. A method of preparing hexafluorobutadiene-1,3 which comprises reacting sym-dichlorodifluoroethylene with elemental fluorine at a temperature of less than 10° C. to produce 1,2,3,4-tetrachloroperfluorobutane and reacting at a temperature between about 50° C. and about 250° C. said butane with zinc in a dechlorinating solvent to dechlorinate said butane and leave hexafluorobutadiene-1,3.

3. A method for preparing hexafluorobutadiene-1,3 which comprises reacting sym-dichlorodifluoroethylene with elemental fluorine at a temperature of less than 10° C. to produce 1,2,3,4-tetrachloroperfluorobutane and reacting said butane with zinc at a temperature of between about 50° C. and about 250° C. in an aliphatic alcohol to dechlorinate said butane and leave hexafluorobutadiene-1,3.

4. A method of preparing hexafluorobutadiene-1,3 which comprises dechlorinating with zinc 1,2,3,4-tetrachloroperfluorobutane dissolved in an aliphatic alcohol at a temperature between about 100° C. and about 200° C.

References Cited in the file of this patent

UNITED STATES PATENTS

| | | |
|---|---|---|
| 924,304 | Askenasy et al. | June 8, 1906 |
| 2,377,297 | Lamb et al. | May 29, 1945 |
| 2,399,024 | Harmon | Apr. 23, 1946 |
| 2,401,897 | Benning et al. | June 11, 1946 |
| 2,590,433 | Blum | Mar. 25, 1952 |
| 2,628,987 | Ruh | Feb. 17, 1953 |
| 2,716,141 | Miller | Aug. 23, 1955 |
| 2,844,636 | Haszeldine et al. | July 22, 1958 |